Dec. 1, 1970     T. L. BARRY     3,544,482
EUROPIUM AND MANGANESE ACTIVATED ALKALINE
EARTH SILICATE PHOSPHORS
Filed March 15, 1968
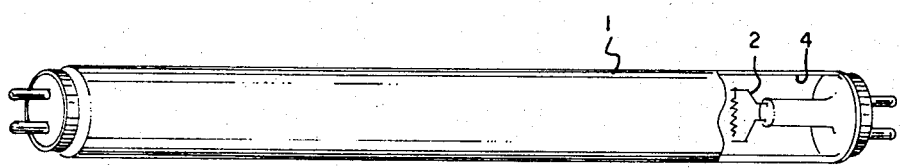
FIG.1
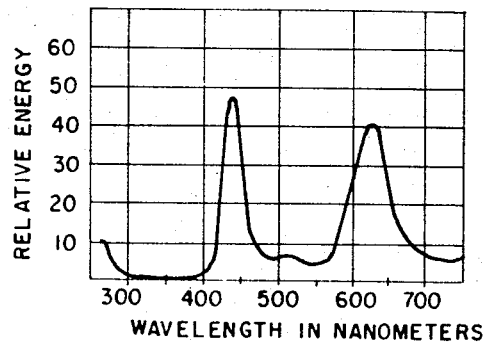
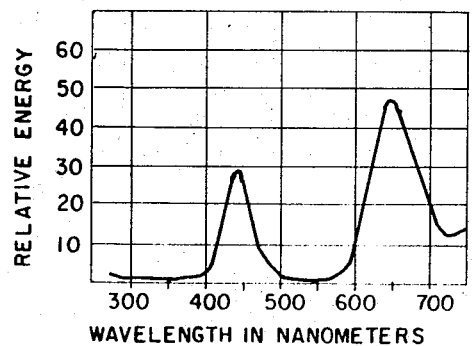
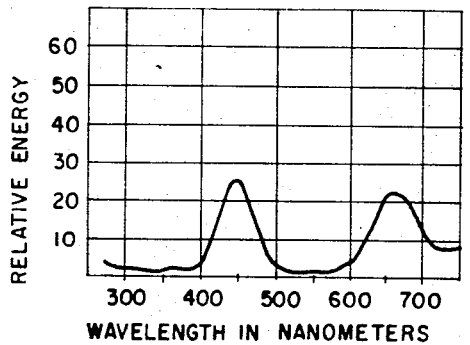
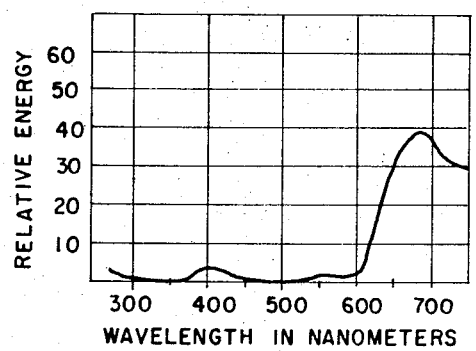
INVENTOR
THOMAS L. BARRY
BY
ATTORNEY United States Patent Office 3,544,482
Patented Dec. 1, 1970

3,544,482
EUROPIUM AND MANGANESE ACTIVATED
ALKALINE EARTH SILICATE PHOSPHORS
Thomas L. Barry, Beverly, Mass., assignor to Sylvania
Electric Products Inc., a corporation of Delaware
Filed Mar. 15, 1968, Ser. No. 713,379
Int. Cl. C09k 1/54
U.S. Cl. 252—301.4                                                   2 Claims

ABSTRACT OF THE DISCLOSURE

A discharge lamp having a phosphor, activated by divalent europium and divalent manganese, disposed on the inner surface of the lamp envelope. Emission bands of the phosphor are preferential in the blue and red regions of the spectrum. The phosphor composition comprises alkaline earth silicate matrices.

BACKGROUND OF THE INVENTION

Field of the invention

This invention relates to phosphor-containing arc discharge lamps. It particularly relates to fluorescent lamps having a phosphor which can be energized by ultraviolet light to emit preferentially in the blue and red regions of the spectrum.

Description of the prior art

Phosphors that have been commonly used with arc discharge lamps include pyrophosphates, orthophosphates, halophosphates and tungstates. The light emitted from such phosphors is generally broad band and thus can satisfactorily be employed in many blends when certain light emission is desired. However in some applications, it is desirable to use a lamp having a narrow band emission and maximum intensity at one or more particular wavelengths.

An example of such an application is a "Gro-Lux" lamp, used commercially for stimulating seed germination and increasing the rate of plant development and growth. The desired emission in such a lamp is that to which plant life is most responsive, namely, the blue and red spectrum bands. Plants utilize the energy in the blue band primarily for photosynthesis and chlorophyll synthesis, while the red band energy is necessary for vegetative growth.

In the prior art, this desired emission was obtained by blending two phosphors, one producing blue emission and the other red emission. Lead activated calcium magnesium tungstate is an example of a blue phosphor used, and tin activated strontium magnesium calcium orthophosphate an example of red. Since the two phosphors were blended into a single suspension prior to deposition on a lamp envelope, no unusual manufacturing problems were presented in their use. However the maintenance of the two phosphors was different, which resulted in a change in the ratio of blue to red energy emitted during the operating life of the lamp.

Maintenance refers to the output, or efficiency, of a phosphor after a certain period of operation in comparison with its initial output. One of the causes of decrease in maintenance of a phosphor is the action of the mercury arc on the phosphor matrix. The arc radiation impinging on the phosphor particles lowers their efficiency with time. On different phosphor matrices, the rate of efficiency decrease varies, which results in the change of ratio, mentioned above. Such a change is undesirable, since it results in inefficiency in the utilization of electrical energy and in its conversion to the spectral energy usable by the plants. Therefore it is preferred to maintain an optimum predetermined ratio of blue to red energy, as designed into the emission of the original lamps, throughout lamp life.

The single phase phosphor, hereinafter disclosed, emitting in both the blue and red bands, maintains a substantially constant ratio of blue to red energy throughout the useful life of the lamp.

SUMMARY OF THE INVENTION

I have discovered an improved arc discharge lamp containing an alkaline earth silicate phosphor, activated by divalent europium and divalent manganese, which emits preferentially in the blue and red regions of the spectrum. The phosphor matrix comprises either an orthosilicate or a pyrosilicate phase and its composition may vary within certain limits. When expressed as

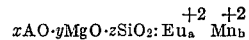

where A represents one or more of the alkaline earth elements calcium, strontium and barium, the concentration of A atoms relative to Mg atoms falls within the ratios of 3:1 to 1:2; the bounding ratios of A+Mg atoms to Si atoms is about 4:2 to 3:2; the atom fraction of Eu can vary from about 0.0004 to 0.4; and the atom fraction of Mn can vary from about 0.0004 to 0.5. Compositions outside these preferred limits are generally too inefficient in the desired blue and/or red emission for the uses contemplated herein.

Expressed another way, the phosphor composition can be as follows:

where $a$ is between about 0.5 and 3.0,
$b$ is between about 1.0 and 2.0,
$c$ is between about 1.0 and 2.0,
$d$ is between about 4.0 and 8.0,
$e$ is between about 0.0004 and 0.4,
$f$ is between about 0.0004 and 0.5.

The spectral energy distribution curves of phosphors prepared according to this invention exhibit two distinctly separate emission bands—one in the blue region of the spectrum and one in the red—when excited by ultraviolet radiation. Furthermore, in at least one of the fluorescent compositions disclosed herein the wave lengths within the blue and red bands at which maximum intensities occur can be varied by compositional variations of the large alkaline earth cations, that is, those of barium, strontium and calcium.

For example, in the orthosilicate phopshor of the type $A_3MgSi_2O_8$, the maximum intensity of red band emission varies with the average ionic radius of the A atoms, that is, the large alkaline earth atoms of barium, strontium and calcium. As the average ionic radius is decreased, the wavelength at which maximum red emission occurs is shifted to longer wavelengths. The ionic radius of barium is larger than that of strontium which, in turn, is larger than that of calcium.

Table I, following, shows the wavelengths at which maximum emission occurs in the blue and red bands for several orthosilicate phosphors having a formula $$A_{3-(e+f)}MgSi_2O_8$$

and illustrates the increase in the wavelength of maximum intensity of red energy as the average ionic radius of the large alkaline earth atoms, A, is varied.

TABLE I

| Phosphor | Ave. "A" radius, angstroms | Blue band peak, nanometers | Red band peak, nanometers |
|---|---|---|---|
| (1) $Ba_{2.86}MgSi_2O_8:Eu^{+2}_{0.04}, Mn^{+2}_{0.10}$ | 1.32 | 437 | 620 |
| (2) $(Ba_{2.11}Sr_{0.75})MgSi_2O_8:Eu^{+2}_{0.04}, Mn^{+2}_{0.10}$ | 1.26 | 437 | 645 |
| (3) $(Ba_{1.36}Sr_{0.75}Ca_{0.75})MgSiO_8:Eu^{+2}_{0.04}, Mn^{+2}_{0.10}$ | 1.18 | 443 | 670 |
| (4) $Sr_{2.86}MgSi_2O_8:Eu^{+2}_{0.04}, Mn^{+2}_{0.10}$ | 1.11 | 458 | 685 |
| (5) $Ca_{2.86}MgSi_2O_8:Eu^{+2}_{0.04}, Mn^{+2}_{0.10}$ | 0.99 | 475 | >700 |

In Table II the blue and red emission peaks and average ionic radius of the A atoms for another orthosilicate phosphor and for a pyrosilicate phosphor are shown.

TABLE II

| Phosphor | Average "A" radius, angstroms | Blue band peak, nanometers | Red band peak, nanometers |
|---|---|---|---|
| (1) $Ba_{0.76}Mg_2Si_2O_7:Eu^{+2}_{0.04}, Mn^{+2}_{0.20}$ | 1.22 | 400 | 690 |
| (2) $(Ba_{0.38}Sr_{0.50})MgSiO_4:Eu^{+2}_{0.02}, Mn^{+2}_{0.10}$ | 1.17 | 437 | 660 |

The measurements shown in Tables I and II were all obtained at 2537 angstrom excitation, which is commonly obtained from the arc of a fluorescent lamp. An enhanced luminescence is obtained under 3650 angstrom excitation, such as is obtained from a high pressure mercury vapor lamp, in which the maximum intensities of emission still occur at about the same blue and red frequencies.

Manganese, alone, will not efficiently activate the $xAO \cdot yMgO \cdot zSiO_2$ compounds to fluorescence. However, when divalent manganese and divalent europium are used together as activators, useful emission is obtained in the blue and red bands. It is believed that an energy transfer occurs, from the europium to the manganese, to activate the manganese and yield the red emission band.

The phosphors herein disclosed may also be useful in phosphor blends where a high color rendering index is desired, that is, to achieve a more balanced white light. An example of such a phosphor is $$Ba_{0.66}Mg_2Si_2O_7:Eu^{+2}_{0.04}Mn^{+2}_{.30}$$

which has a strong red emission peak at 690 nanometers and has a weak blue emission peak. This phosphor may be blended with conventional phosphors, which are usually deficient in red emission, to achieve a balanced white light.

Adjustment of the intensities of the blue and red peaks is obtained by compositional variation of the europium and manganese in the phosphors. In the previous example, the manganese concentration (atom fraction) is 30.0% of the sum of A atoms plus activating atoms, which is 7½ times that of the europium concentration, with the result that the red peak is about 12 times higher than the blue peak. Consequently, a much higher percentage of the lamp's total emission is in the red band.

Above a manganese concentration of about 0.30 atom fraction, a diminution of the red emission occurs in this particular phosphor, and the total amount of red energy continues to decrease with increasing amounts of manganese. At about 0.005 or 0.01 atom fraction, the efficiency of red emission is generally too low to be useful.

The minimum amount of manganese necessary to exhibit a red peak is about 0.001 atom fraction.

An arc discharge device utilizing the phosphor in this invention can be the usual fluorescent lamp, such as is shown in U.S. Pat. 2,961,566 to Weymouth et al. The device comprises a tubular glass envelope, electrodes at each end thereof, a mercury fill and has the phosphor disposed on the inner surface of the envelope. During operation, ultraviolet radiation from an arc between the two electrodes impinges on the phosphor and excites it to emission.

BRIEF DESCRIPTION OF THE DRAWING

FIG. 1 shows an arc discharge lamp, partly broken away, having a phosphor according to this invention disposed on the inner surface of the envelope.

FIG. 2 is a spectral energy distribution curve of a barium magnesium orthosilicate phosphor, showing the blue and red emission peaks.

FIGS. 3 and 4 are similar curves for two different barium strontium magnesium orthosilicate phosphors.

FIG. 5 is a spectral energy distribution curve of a barium magnesium pyrosilicate phosphor, showing the depressed height of the blue peak in relation to the red peak.

DESCRIPTION OF THE PREFERRED EMBODIMENT

One embodiment of an arc discharge lamp in accordance with this invention, as shown in FIG. 1, comprises a tubular glass envelope 1 and electrodes 2 at each end thereof. Within envelope 1 is a fill including mercury. On the inner surface of envelope 1, there is a coating 4 of an alkaline earth silicate phosphor, activated by divalent europium and divalent manganese. When an arc is struck between electrodes 2, ultraviolet radiation therefrom impinges onto phosphor 4 and excites it to fluorescence. The resultant fluorescence can be predominantly blue and red, or predominantly red, depending on the phosphor composition.

In order to obtain the desired radiation the composition of phosphor 4 must be carefully controlled within certain limits, as mentioned previously. In preparing the phosphors, the water content of the manganese carbonate, silicic acid and basic magnesium carbonate is first determined in order to compensate for sorbed water in formulating the blends.

Starting mixtures are prepared by dry blending the raw materials and then firing the mixture, preferably in alumina trays, at about 600° C. to initiate the decomposition of the alkaline earth carbonates. The prefired mixtures are then fired at 1000 to 1300° C. for from 2 to 12 hours in a reducing atmosphere of 80% nitrogen and 20% hydrogen. After cooling in the reducing atmosphere, residual chloride is removed by a water wash. Ammonium chloride may be used as a flux to enhance the crystallinity of the fired product.

The following examples are offered as specific embodiments of my invention:

EXAMPLE I
$Ba_{2.83}MgSi_2O_8:Eu^{+2}_{0.02}, Mn^{+2}_{0.15}$

| Material | Moles | Grams |
|---|---|---|
| $BaCO_3$ | 2.83 | 16.755 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.01 | 0.106 |
| $MnCO_3$ | 0.15 | 0.517 |
| $NH_4Cl$ | 0.40 | 0.642 |

The weighed materials were intimately mixed by dry blending in a 100 ml. polystyrene mixing jar. Glass beads were added to aid in the blending. After mixing for 15 minutes the glass beads were removed and the mixture was placed in an alumina tray. The tray was fired at 600° C. for 30 minutes. The mixture was then placed in a silica tube, which was flushed with nitrogen for 5 minutes, and was then fired at 1200° C. for 4 hours in an atmosphere of 80% nitrogen–20% hydrogen. After cooling to room temperature in the nitrogen-hydrogen atmosphere, the fired material was water-washed and dried. The resultant phosphor was pulverized, dispersed in a suitable liquid and coated on the inner surface of envelope 1 by processes commonly used in the industry.

FIG. 2 shows the spectral energy distribution of this phosphor and particularly the strong blue and red emission. The blue emission peaks at 437 nanometers and a has a relatively energy of 48 units; the red emission peaks at 620 nanometers and has a relative energy of 41 units. At other regions of the spectrum, for example, the green region, the relative energy of emission is below 10 units. In the following examples of other phosphor compositions within the scope of this invention, the same mixing and firing procedures were used as in Example I.

EXAMPLE II
$(Ba_{2.08}Sr_{0.75})MgSi_2O_8:Eu^{+2}_{0.02}, Mn^{+2}_{0.15}$

| | | |
|---|---|---|
| $BaCO_3$ | 2.08 | 12.315 |
| $SrCO_3$ | 0.75 | 3.322 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.01 | 0.106 |
| $MnCO_3$ | 0.15 | 0.517 |
| $NH_4Cl$ | 0.40 | 0.642 |

The spectral energy distribution curve of the barium strontium magnesium orthosilicate phosphor of Example II is shown in FIG. 3. The blue and red peaks are at 437 and 465 nanometers and have relative energies of 29 and 46 units respectively. Spectral emission outside the blue and red bands is very low, less than about 5 units.

EXAMPLE III
$(Ba_{1.33}Sr_{0.75}Ca_{0.75})MgSi_2O_8:Eu^{+2}_{0.02}, Mn^{+2}_{0.15}$

| | | |
|---|---|---|
| $BaCO_3$ | 1.33 | 7.874 |
| $SrCO_3$ | 0.75 | 3.322 |
| $CaCO_3$ | 0.75 | 2.252 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.01 | 0.106 |
| $MnCO_3$ | 0.15 | 0.517 |
| $NH_4Cl$ | 0.40 | 0.642 |

EXAMPLE IV
$(Ba_{0.38}Sr_{0.50})MgSiO_4:Eu^{+2}_{0.02}, Mn^{+2}_{0.10}$

| | | |
|---|---|---|
| $BaCO_3$ | 0.38 | 2.250 |
| $SrCO_3$ | 0.50 | 2.214 |
| $3MgCO_3 \cdot Mg(OH)_2 \cdot 3H_2O$ | 0.25 | 2.740 |
| $SiO_2$ | 1.00 | 1.802 |
| $Eu_2O_3$ | 0.01 | 0.106 |
| $MnCO_3$ | 0.10 | 0.345 |
| $NH_4Cl$ | 0.40 | 0.642 |

The spectral energy distribution curve of the barium strontium magnesium orthosilicate phosphor of Example IV is shown in FIG. 4. The blue and red emission peaks are at 437 and 660 nanometers and have relative energies of 25 and 22 units respectively.

EXAMPLE V
$Ba_{0.76}Mg_2Si_2O_7:Eu^{+2}_{0.04}, Mn^{+2}_{0.20}$

| | | |
|---|---|---|
| $BaCO_3$ | 0.76 | 4.500 |
| $3MgCO_3 \cdot Mg(OH)_2 \cdot 3H_2O$ | 0.50 | 5.480 |
| $SiO_2$ | 2.00 | 3.605 |
| $Eu_2O_3$ | 0.02 | 0.211 |
| $MnCO_3$ | 0.20 | 0.690 |
| $NH_4Cl$ | 0.40 | 0.642 |

The spectral energy distribution curve of the barium magnesium pyrosilicate phosphor of Example V is shown in FIG. 5. Emission in the blue region is greatly depressed and has a relative energy of only 3 units, in contrast to the red energy at 690 nanometers of 38 units.

Various changes in the details and materials which have been described herein may be made by those skilled in the art within the principle and scope of the invention. It is my intention; however, to be limited only by the scope of the appended claims.

I claim:
1. A phosphor having the formula $xAO \cdot vMgO \cdot zSiO_2$ activated by divalent europium and divalent manganese, where A is an alkaline earth metal other than Mg, $x$ is ½ to 3 times the value of $y$, $x+y$ is 1½ to 2 times the value of $z$ and each activator is present in an atom fraction of at least 0.0004.

2. The phosphor of claim 1 wherein the europium concentration is between about 0.0004 and 0.4 atom fraction and the manganese concentration is between about 0.0004 and 0.5 atom fraction.

References Cited
UNITED STATES PATENTS

| | | | |
|---|---|---|---|
| 2,297,108 | 9/1942 | McKeag et al. | 252—301.4 |
| 3,260,675 | 7/1966 | McAllister | 252—301.4 |

TOBIAS E. LEVOW, Primary Examiner

R. D. EDMONDS, Assistant Examiner